(12) United States Patent
Meinl (10) Patent No.: US 7,784,987 B2
(45) Date of Patent: Aug. 31, 2010

(54) DEVICE FOR COUPLING LIGHT INTO A FIBER-OPTIC OPTICAL WAVEGUIDE

(75) Inventor: Jürgen Meinl, Hohenstein-Holzhausen (DE)

(73) Assignee: Schott AG, Köln (DE)

( * ) Notice: Subject to any disclaimer, the term of this patent is extended or adjusted under 35 U.S.C. 154(b) by 257 days.

(21) Appl. No.: 12/137,891

(22) Filed: Jun. 12, 2008

(65) Prior Publication Data

US 2008/0310182 A1    Dec. 18, 2008

(30) Foreign Application Priority Data

Jun. 12, 2007    (DE)    ........................ 10 2007 027 615

(51) Int. Cl.
*F21V 8/00* (2006.01)
(52) U.S. Cl. .................. 362/555; 362/554; 362/258
(58) Field of Classification Search ................. 362/554, 362/555, 556, 551, 558, 574, 575, 268; 385/115, 385/116, 119, 31–35
See application file for complete search history.

(56) References Cited

U.S. PATENT DOCUMENTS

| 5,857,041 | A | * | 1/1999 | Riser et al. | ..................... 385/31 |
| 6,036,343 | A | * | 3/2000 | Tomioka et al. | ............. 362/574 |
| 6,193,401 | B1 | | 2/2001 | Girkin et al. | |
| 6,832,849 | B2 | * | 12/2004 | Masumura et al. | .......... 362/551 |
| 6,945,674 | B2 | * | 9/2005 | Yoneda et al. | .............. 362/294 |

FOREIGN PATENT DOCUMENTS

EP    1 007 993 B1    10/2001

* cited by examiner

*Primary Examiner*—Bao Q Truong
(74) *Attorney, Agent, or Firm*—Laurence A. Greenberg; Werner H. Stemer; Ralph E. Locher (57) ABSTRACT

A fiber-optic device includes at least one LED light source having at least one light-emitting semiconductor surface, a fiber-optic optical waveguide having a multiplicity of individual optical fibers combined at one end to form a light-receiving entrance surface, and a lens configuration having optical lenses associated directly with one another, for imaging the light from the LED light source onto the entrance surface. In order to optimize the coupling of LED light into an optical waveguide with regard to technical complexity, efficiency and economic costs, to make the light from different types of LED light sources usable in an identical manner and to avoid undesirable optical effects during the transmission of light, the lens configuration includes at least two aspherical lenses, with at least one input lens and one output lens having an increased diameter relative thereto, and an input lens is associated with each light-emitting semiconductor surface.

21 Claims, 4 Drawing Sheets

DEVICE FOR COUPLING LIGHT INTO A FIBER-OPTIC OPTICAL WAVEGUIDE

CROSS-REFERENCE TO RELATED APPLICATION

This application claims the priority, under 35 U.S.C. §119, of German Patent Application DE 10 2007 027 615.1, filed Jun. 12, 2007; the prior application is herewith incorporated by reference in its entirety.

BACKGROUND OF THE INVENTION

Field of the Invention

The invention relates to a fiber-optic device including at least one LED light source having at least one light-emitting semiconductor surface, a fiber-optic optical waveguide including a multiplicity of individual optical fibers combined at one end to form a light-receiving entrance surface, and a lens configuration having optical lenses associated directly with one another for imaging the light from the LED light source onto the entrance surface.

Various devices and methods are known for coupling light from an LED light source into an optical waveguide. Those devices and methods generally serve to replace light sources with other light generating techniques, such as halogen and gas discharge lamps, for example, in order to ensure improved conditions for lifetime or energy efficiency of the light source. LED light sources are also preferably used when variably colored light is to be generated.

Furthermore, fiber-optic devices of that type are used in order to transport light through the use of fiber-optic optical waveguides over relatively large distances or through material that is poorly permeable or impermeable to light from the light source to the illumination location largely without any losses. In that case, the fiber-optic optical waveguide includes a multiplicity of individual optical fibers, which are preferably embodied as glass fibers. Other fiber-optic materials can likewise be used according to the invention and are correspondingly encompassed by the subject matter of the invention. In this case, the individual fibers form an entrance surface for the light at the optical waveguide end provided for coupling in.

It is known that it is necessary for the light from the LED light source to be coupled into the fiber-optic optical waveguide as completely as possible in order to be able to replace other light generating techniques satisfactorily. When using LED light with a fiber-optic optical waveguide, the greatest losses occur, as is known, when coupling the LED light into the optical waveguide.

In connection with the invention, an LED light source is understood to mean a light-emitting diode or a light-emitting diode configuration which has at least one light-emitting semiconductor surface. This is taken to mean both light-emitting diodes which emit white light and light-emitting diodes which emit colored light. Furthermore, the invention encompasses both light-emitting diodes having semiconductor surfaces which emit the light in one spectral (monochromatic) range and light-emitting diodes having semiconductor surfaces which include a combination of monochromatically emitting semiconductor surfaces, in which case the combination of the semiconductor surfaces can generate specific colors brought about by the mixing of the light in the case of far field observation.

Such LED light sources are generally of lower light intensity than halogen and gas discharge lamps, that is to say that, per unit area of the light-generating surface, less light power is generated in the case of the LED light source than in the case of the light generating techniques to be replaced. This has a disadvantageous effect when coupling light into an optical waveguide since a higher light power in the case of LED light sources is usually associated with a correspondingly larger light-generating semiconductor surface.

The invention has recognized that the optical boundary conditions of the LED light source and of the lens system for optimizing the efficiency of coupling light into the optical waveguide require the light-generating surface to be large in relation to the entrance surface of the optical waveguide.

By contrast, the optical boundary conditions of the fiber-optic optical waveguide or of its entrance surface for optimizing the efficiency require that the light-generating surface must be small in relation to the entrance surface of the optical waveguide. This ensures that the solid angle predetermined by the optical waveguide for the detection of the light available in total is not exceeded by the lens system, with accompanying light losses.

In order to satisfy those conflicting requirements, known devices attempted to concentrate the light from the LED light source through the use of a primary lens, connected directly to the light-generating surface, in such a way that it was still possible to effect coupling into an optical waveguide optimized with regard to reducing losses.

Alternatively or supplementarily thereto, provision was made for arranging the optical waveguides directly on the light-generating surface and therefore in so-called direct abutting coupling on the LED light source.

Furthermore, plastic injection-molded parts have been used as a so-called LED attachment optical system in order to improve the efficiency of coupling in light. Like the primary lenses, they have to be disposed directly on the light-generating semiconductor surface in order to ensure that light is coupled into the optical waveguide sufficiently effectively. In that case, those prior art components have plane or curved surfaces in order to enable the light to be coupled into the optical waveguide.

Finally, optical elements such as light guiding rods or light guiding cones or fiber-optic cones are known for sufficiently mixing the colored light in the case of LED light sources having semiconductor surfaces including a combination of semiconductors which emit monochromatically in different colors. This effect, known as near field mixing, is required since the light-emitting semiconductor surface is divided into different color regions in the near range. Upon direct coupling into the optical waveguide, each of the color regions is imaged onto a partial region of the entrance surface and correspondingly guided in the optical waveguide. Optical effects that are undesirable are brought about as a result thereof on the coupling-out side of the optical waveguide due to physical principles. The effects include annular distribution of the light of different wavelengths, aberrations, extinctions, interferences and the like. As a result of such optical effects, further processing of the light is accompanied on the output side of the optical waveguide by considerable power losses.

In addition, the prior art methods and devices mentioned above always require modes of connection between the LED and the entrance surface of the optical waveguide which are specifically adapted to the LED light source. In addition, LED light sources having a larger number of light-emitting semiconductor surfaces and having different color regions can only be realized with special methods and in this regard technical complexity and high costs.

One example of such a known device is disclosed in European Patent EP 1 007 993 B1, corresponding to U.S. Pat. No.

6,193,401. In that case, the light from two LED light sources is imaged onto the input side of a monomode fiber indirectly through a semitransparent mirror. The lens configuration is embodied with spherical lenses and as an injection-molded part in the form of an attachment optical system. One disadvantage of those embodiments is that the device is provided exclusively for one type of an LED light source. In general it is not possible to use other types of LED light sources. That means that the device can be used and maintained only for as long as the specific type of the LED light source provided therefor is produced. That means that the use of the prior art devices in products having a long service life is inexpedient or uneconomical.

SUMMARY OF THE INVENTION

It is accordingly an object of the invention to provide a device for coupling light into a fiber-optic optical waveguide, which overcomes the hereinafore-mentioned disadvantages of the heretofore-known devices of this general type, in which the coupling of LED light into an optical waveguide is optimized with regard to technical complexity, efficiency and economic costs, in which the light from different types of LED light sources can be used in an identical manner and in which undesirable optical effects during the transmission of light are avoided.

With the foregoing and other objects in view there is provided, in accordance with the invention, a fiber-optic device, comprising at least one LED light source having at least one light-emitting semiconductor surface, a fiber-optic optical waveguide formed of a multiplicity of individual optical fibers combined at one end to form a light-receiving entrance surface, and a lens configuration having at least two optical aspherical lenses associated directly with one another for imaging light from the at least one LED light source onto the entrance surface. The lenses include at least one input lens and one output lens. The one output lens has a larger diameter than the at least one input lens, and one input lens is associated with each respective light-emitting semiconductor surface.

Consequently, a device is advantageously provided which can be used as a condenser independently of the LED types being used. This means that neither the construction of the LED light source, for example with or without primary lens technology, nor the size of the LED, has to be specifically adapted to the condenser type, in contrast to known devices.

In accordance with another feature of the invention, a preferred device has a condenser and a distance x between a front vertex point and an input focal point of the input lens is less than a distance x' between a back vertex point and an output focal point of the output lens. This ensures that the divergent beams coming from the input lens are completely acquired and the optimal light power for feeding into the optical waveguide is thus available. The device according to the invention advantageously improves the use of LED light together with a fiber-optic optical waveguide because it makes it possible, particularly when coupling the LED light into the optical waveguide, to largely avoid losses in relation to known configurations.

In accordance with a further feature of the invention, the input focal length of the output lens is greater than its output focal length. The beam path is thereby focused in such a way that the coupling-in angle into the optical waveguide is oriented optimally for coupling in the light. A small distance between the light-emitting semiconductor surface and the plane surface of the input lens additionally ensures an acquisition range of the optical waveguide over the entire range of the optimized solid angle. According to the invention, it has been found to be advantageous for this purpose for the imaging ratio v of the lens configuration to lie between 1:2.4 and 1:2.2, and preferably to be v=1:2.3.

In accordance with an added feature of the invention, the input lens ensures an input angle $\Theta_E$ for taking up the light from the semiconductor surface in a range of between 110° and 130°, preferably $\Theta_E$=120°. Supplementarily or alternatively, it is provided according to the invention that the output lens of the lens configuration focuses the light from all of the semiconductor surfaces at an angle $\Theta_A$ in a range of between 65° and 75° onto the entrance surface of the optical waveguide, preferably at an angle $\Theta_A$=70°. The invention advantageously provides a device in which the coupling of LED light into an optical waveguide is optimized with regard to technical complexity and efficiency and the economic costs. Moreover, the device according to the invention affords the advantage that the light from different types of LED light sources can be used in an identical manner.

The device according to the invention thus makes it possible to replace known light sources where other light generating techniques have usually been used, such as halogen and gas discharge lamps, for example. This makes it possible, for the typical areas of application, to obtain a longer lifetime of the systems equipped in this way and to improve the energy efficiency in comparison with known light sources, without having to accept the disadvantageous optical effects that otherwise arise when coupling the light into the optical waveguide. It is thus additionally possible to use LED light sources when variably colored light is to be generated.

It has proved to be particularly advantageous that the device according to the invention makes it possible to conduct LED light over large distances with the aid of fiber-optic optical waveguides. The optimum utilization of the light power of the LED light source ensures that the LED light is conducted to the illumination location largely without any losses. In this case, the fiber-optic optical waveguide includes a multiplicity of individual optical fibers, which are preferably embodied as glass fibers. Other fiber-optic materials can likewise be used according to the invention and are correspondingly encompassed by the subject matter of the invention. In this case, the individual fibers form an entrance surface for the light at the optical waveguide end provided for coupling in. The invention thus ensures that when coupling in light and during transmission in the fiber-optic optical waveguide, optimum light quality is available at the optical waveguide output.

In accordance with an additional feature of the invention, in order to take up the light into the lens configuration, an input lens is provided in each case for each light-emitting semiconductor surface of the LED light source. In this connection, an LED light source is understood to be a light-emitting diode or a configuration of light-emitting diodes. In this case, the LED light source has at least one emitting semiconductor surface. In this case, the LED light source can emit both white light and colored light. Moreover, the invention encompasses LED light sources having semiconductor surfaces which emit the light in one spectral range (monochromatically). The invention likewise encompasses LED light sources emitting light by a combination of different monochromatically emitting semiconductor surfaces. In this case, combinations of semiconductor surfaces are provided, inter alia, in which the mixing of the light from the monochromatically emitting semiconductor surfaces can produce color effects in the case of far field observation. It is alternatively provided that the LED light source has a light-emitting semiconductor surface, and that the input lens and the output lens of the lens configuration form an optical axis on which the semiconductor surface and the entrance surface of the optical waveguide are disposed. The configuration according to the invention of the individual components of the fiber-optic device furthermore advantageously avoids undesirable optical effects during the transmission of light that would reduce the efficiency of coupling in light.

In accordance with yet another feature of the invention, the LED light source has more than one light-emitting semiconductor surface, and the semiconductor surfaces with the assigned input lenses have a symmetrical configuration with respect to the optical axis defined by the output lens.

In accordance with yet a further feature of the invention, an input lens is disposed in a centered manner on the optical axis defined by the output lens.

In accordance with yet an additional feature of the invention, alternatively or supplementarily, each of the light-emitting semiconductor surfaces is subdivided into different color regions with identical color configuration, the semiconductor surfaces with the assigned input lenses have a symmetrical configuration about the optical axis, and the configuration of the color regions of each semiconductor surface with respect to the optical axis is identical.

In accordance with again another feature of the invention, the number of semiconductor surfaces disposed about the optical axis amounts to the number or a multiple of the number of color regions of the semiconductor surfaces. In this case, it has proved to be advantageous that the semiconductor surfaces have four color regions having in each case two identical and two different colors, preferably the colors red (R), green (G) and blue (B), and that two color regions of the same color are adjacent each of the two different color regions.

In accordance with again a further feature of the invention, the semiconductor surfaces have color regions with a substantially square form or shape, the color regions having different colors emit red (R) and blue (B) light, and the two color regions having an identical color emit green (G) light.

Through the use of the configuration of the color regions and the assigned optical lenses, it is ensured according to the invention that color effects which arise in far field observation are not destroyed by undesirable optical effects through the lens configuration and the optical waveguide, but rather sufficient light mixing that ensures optimum transmission of light is already produced before the light is coupled into the optical waveguide.

In accordance with again an added feature of the invention, the optical surfaces of the device are antireflection-coated. This prevents reflections that could adversely influence the efficiency of coupling in light.

In accordance with again an additional feature of the invention, a further optimization of the coupling of light into the optical waveguide is achieved through the use of the device according to the invention in that the optical fibers of the optical waveguide at the entrance surface are hot melt bonded, adhesively bonded and/or press-fitted in a terminating sleeve. This ensures that the optical properties of the surfaces in the beam path are optimally available for the respective light entrance and light exit.

The invention thus provides a device in which the efficiency of coupling light into the optical waveguide is optimized by the optical boundary conditions of the LED light source and those of the lens system. At the same time, the efficiency is optimized through the use of the optical boundary conditions of the fiber-optic optical waveguide or of its entrance surface, in such a way that the light-generating surface is small in relation to the entrance surface of the optical waveguide. This prevents a situation in which the solid angle predetermined by the optical waveguide for the acquisition of the light available in total is exceeded by the lens configuration. Light losses are consequently avoided.

It has proved to be particularly advantageous that the device according to the invention can be used both in the case of a configuration of simple light-emitting semiconductor surfaces and in the case of LED light sources which have a primary lens at the semiconductor surfaces. Furthermore, all alternative or supplementary coupling techniques can be employed, in such a way that the device according to the invention can be used universally in different LED systems.

Furthermore, the plastic injection-molded parts which are known from the prior art and which are used as a so-called LED attachment optical system can continue to be used, in such a way that corresponding costs for conversion can be obviated.

Finally, optical elements such as light guiding rods or light guiding cones or fiber-optic cones are still able to be used according to the invention, without the need for modes of connection between the LED and the entrance surface of the optical waveguide that are specifically adapted to the LED light source.

In accordance with a concomitant feature of the invention, an additional optical element having a negative focal length is inserted directly in front of the entrance surface of the optical waveguide. The element deflects the light at an angle corresponding to the imaging of the boundary regions between the light-emitting semiconductor surfaces at the solid angle of the output lens in such a way that the deflection compensates for brightness differences on the entrance surface of the optical waveguide. It has been recognized according to the invention that when coupling in light from an LED light source with a plurality of light-emitting semiconductor surfaces, there are brighter and darker regions due to the construction in an angular range of the imaging through the output lens. The brighter and darker regions of the angular range correspond to the boundary regions of the light-emitting semiconductor surfaces since less or no light-emitting material at all is present at the boundaries of the semiconductor surfaces. The greater the distance between the light-emitting semiconductor surfaces, the larger, too, is the angular range in which no or less light is present. This means that there are likewise brighter and darker regions during the imaging of the light through the output lens. With the device according to the invention, the light radiated from the output lens onto the entrance surface of the optical waveguide is advantageously deflected at the solid angle through the use of an additional optical element having a negative focal length. In this case, the brighter and darker regions are superimposed before the light impinges on the entrance surface of the optical waveguide. The transmitted light is thus advantageously coupled into the optical waveguide with a largely homogeneous light distribution without regions of different brightness, thus avoiding undesirable optical effects such as, for example, bright/dark regions or rings on the coupling-out side of the optical waveguide.

In this case, the optical element having a negative focal length is disposed in direct proximity in front of the entrance surface of the optical waveguide and has a negative focal length corresponding to the configuration and number of the boundary regions between the light-emitting semiconductor surfaces of the LED light source. In this case, the light deflection that can be achieved through the use of the optical element correlates directly with the bright/dark regions arising in the angular range of the imaging of the output lens, in such a way that the bright/dark regions are optimally superimposed. It is advantageous in this case that a homogeneous coupling of light into the optical waveguide and, accordingly, a homogeneous light emission at the output of the optical waveguide are produced.

Other features which are considered as characteristic for the invention are set forth in the appended claims.

Although the invention is illustrated and described herein as embodied in a device for coupling light into a fiber-optic optical waveguide, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
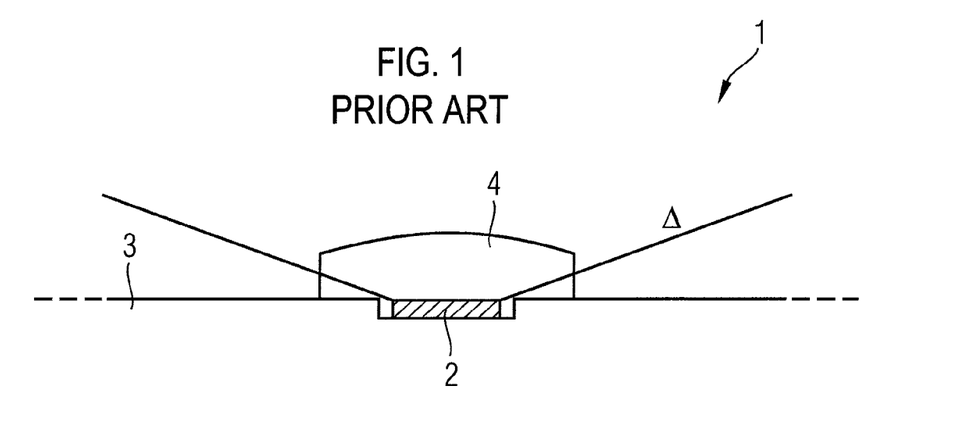
FIG. 1 is a basic diagrammatic, longitudinal-sectional view illustrating a construction of an LED light source with a light-emitting semiconductor surface.

Referring now to the figures of the drawings in detail and first, particularly, to FIG. 1 thereof, there is seen a basic illustration of a construction of an LED light source 1 of the prior art with a light-emitting semiconductor surface 2. The light-emitting semiconductor surface 2 is accommodated in a circuit board 3. A solid angle range Δ into which the semiconductor surface 2 emits light is substantially dependent on the configuration of the semiconductor surface 2 on the circuit board 3. In the case of simple LED circuit boards, it extends over an entire half-space around the semiconductor surface 2.

Therefore, in the event of coupling into an optical waveguide, only part of the emitted light is regularly taken up. Consequently, considerable losses of light power are produced in the event of coupling into the optical waveguide.

In order to reduce those losses, in the prior art, as shown in the drawing, a primary lens 4 is disposed on the semiconductor surface 2. The lens is intended to restrict the beam path to a smaller solid angle Δ. Although that measure is effective, it does not suffice, for the use of LED light sources for the transmission of light in fiber-optic optical waveguides, to ensure a sufficient brightness for the desired light applications at the end of the optical waveguide, since the optical waveguide, for its part, as an optical element, requires its own optical principles.

Thus, a fiber-optic optical waveguide has an aperture angle, which is typically approximately 70°. The principle of optical imagings according to the optical invariant requires the product of the area of the luminous medium in the object space and its solid angle in the object space to be less than or equal to the product of the area of the luminous medium in the image space and its solid angle in the image space. The area ratio is accordingly reciprocal to the solid angle ratio. In the case of the aperture angle for optical waveguides, the ratio is approximately 1:6, that is to say that the entrance surface of the optical waveguide would have to be approximately 6 times larger than the light-emitting semiconductor surface. Particularly in the case of a plurality of semiconductor surfaces disposed alongside one another, that results in dimensions for the optical waveguide which are economically and technically inexpedient.

An additional factor is that LED light sources generally include a plurality of light-emitting semiconductor surfaces 2, as is shown in the subsequent figures, in order to ensure that the required light power can be generated. Furthermore, LED light sources with a color effect are also intended to be able to be used. In that case, the color effect is produced through the use of a plurality of semiconductor surfaces 2 with different color regions that are disposed alongside one another. The configuration of different semiconductor surfaces 2 alongside one another and with different color regions gives rise to further optical effects that can adversely influence the light power and the light effect.

In the event of imaging or coupling the light into the optical waveguide, the different semiconductor surfaces or different color regions are imaged onto the entrance surface of the optical waveguide. That has the effect that the individual fibers of the optical waveguide carry different light components. In the case of color LED light sources having red, green and blue light components, specific fibers carry red light, others carry green light and still others blue light. In the case of a multiarm, unmixed optical waveguide, that has the effect that the individual optical waveguide arms conduct corresponding color components to different locations, which is generally undesired.

The fibers in the optical waveguide would have to be mixed very finely on the coupling-in side in order to rectify that deficiency on the part of the optical waveguide. That fine mixing would have to be performed in a highly controlled manner and should not permit random accumulations of optical fibers. Such fine mixing is considerably complicated and correspondingly cost-intensive.

Fiber-optic optical waveguides additionally have the property that they are angularly conformal to a certain extent. In other words, the angular distribution present on the coupling-in side is substantially also reproduced on the coupling-out side of the optical waveguide.

A certain "mixing" already takes place, but a rotationally symmetrical distribution is present. If, due to the coupling-in conditions, for example when coupling in RGB colored light, the different colors are coupled into the optical waveguide into different angular ranges, then a colored ring structure arises in the far field on the coupling-out side. That structure is generally undesired. The mixing of the fibers does not influence that structure.

The same effect is produced at the boundaries of the semiconductor surfaces, where no light or only little light is emitted. Those structures with different brightness also produce corresponding undesired effects at the light exit end, as is described in more detail below with regard to FIG. 4A.

Figure 2:
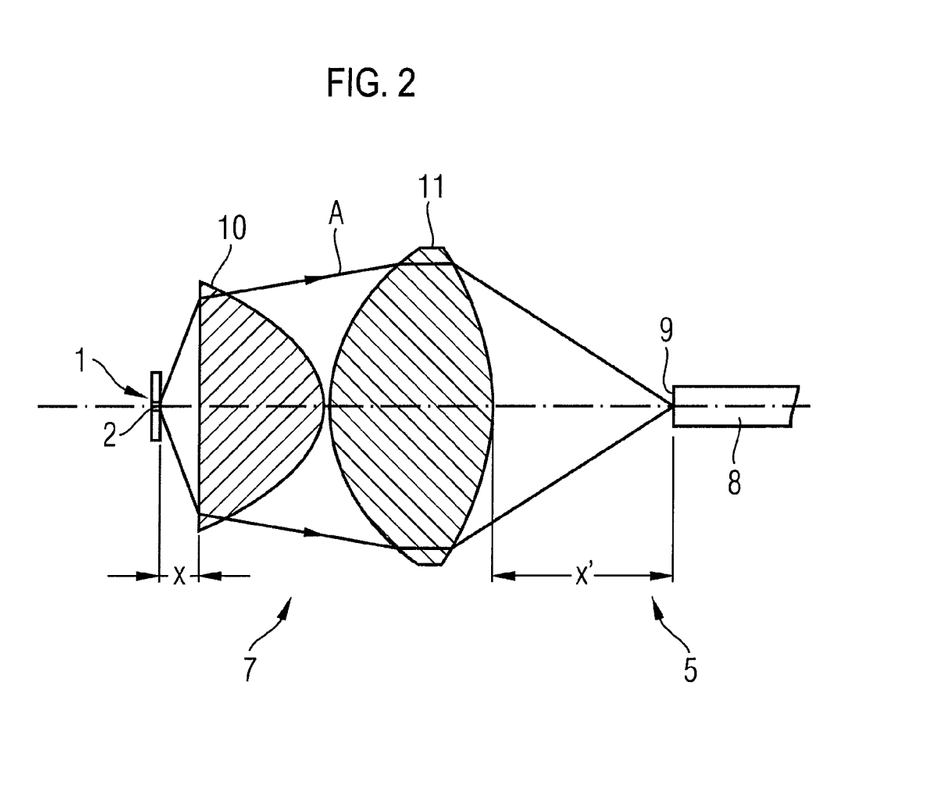
FIG. 2 is a fragmentary, cross-sectional view of a device according to the invention with a light-emitting semiconductor surface and an asymmetrical lens configuration and optical waveguide.

FIG. 2 accordingly shows a fiber-optic device 5 according to the invention in a cross-sectional view, with an LED light source 1 having a light-emitting semiconductor surface 2, an asymmetrical lens configuration 7 as well as an optical waveguide 8.

The fiber-optic optical waveguide 8 includes a multiplicity of individual optical fibers, which are combined at one end to form a light-receiving entrance surface 9. The lens configuration 7 is assigned directly to the semiconductor surface 2 and the entrance surface 9 and has optical lenses that image the light from the LED light source 1 onto the entrance surface 9.

According to the invention, the lens configuration 7 includes two aspherical lenses. In this case, the lens assigned to the semiconductor surface 2 is designated as an input lens 10 and the lens assigned to the optical waveguide 8 is designated as an output lens 11. The output lens 11 has an increased diameter in comparison with the input lens 10. The beam path of the light is symbolized through the use of an arrow A.

In the case of the device 5 according to the invention, the lenses are disposed in such a way that a distance x between a front vertex point and an input focal point of the input lens 10 is less than a distance x' between a back vertex point and an output focal point of the output lens 11. Furthermore, an input focal length of the output lens 11 is greater than its output focal length.

It is thus advantageously possible for the light radiated into the solid angle of the light-emitting semiconductor surfaces 2 to be imaged completely onto the entrance surface 9, with the aperture angle of the optical waveguide being taken into account. It is consequently possible to dispense with adapting the optical waveguide diameter to the light-emitting semiconductor surface 2. The large solid angle of the LED light source 1 is thus fully covered, in such a way that the light can be coupled into the small aperture angle and onto the entrance surface 9 of the optical waveguide 8.

Consequently, not only the boundary conditions of the optical properties of the light source 1 or of the optical waveguide 8 when coupling in light but also the interaction of the two optical systems, are taken into account.

Figure 3A:
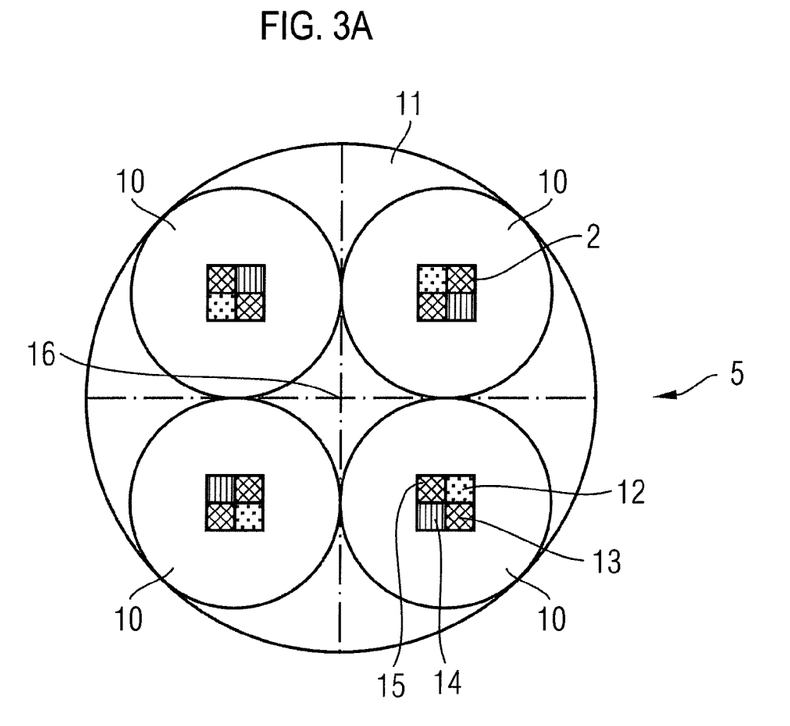
FIG. 3A is a top-plan view illustrating a basic construction of an LED light source with four light-emitting semiconductor surfaces having different color regions.

FIG. 3A is a plan view illustrating a basic construction of an LED light source 1 in connection with the invention. The LED light source 1 has four light-emitting semiconductor surfaces 2. In this case, the light-emitting semiconductor surfaces 2 are provided with different color regions 12, 13, 14, 15. In order to take up the light, an input lens 10 is provided in each case in the lens configuration 7 for each light-emitting semiconductor surface 2 of the LED light source 1. The semiconductor surfaces 2 form a symmetrical configuration with the assigned input lenses 10 with respect to an optical axis 16 defined by the output lens 11. The output lens 11 is represented by an outer circumferential circle in the figure. Accordingly, the optical axis 16 should be conceived of as being perpendicular to the image plane through the circle midpoint of the outer circumferential circle. The input lenses 10 are disposed uniformly about the optical axis 16.

Each of the light-emitting semiconductor surfaces 2 is subdivided into the different color regions 12, 13, 14, 15 having an identical color configuration, which is made clear by different hatching in the drawing. In this case, the semiconductor surfaces 2 together with the assigned input lenses 10 form a symmetrical configuration about the optical axis 16. The configuration of the color regions 12, 13, 14, 15 of each semiconductor surface 2 is identical with respect to the optical axis 16. This means that each semiconductor surface 2 is disposed, with respect to the closest adjacent semiconductor surfaces 2, in a manner rotated by 90° with respect to one another.

The number of semiconductor surfaces 2 disposed about the optical axis 16 is equal to the number of color regions of a semiconductor surface 2. However, the invention also includes configurations in which the number of semiconductor surfaces 2 amounts to a multiple of the number of color regions of a semiconductor surface 2. Furthermore, the invention also encompasses configurations in which the number of semiconductor surfaces 2 is chosen independently of the number of color regions, in particular configurations with semiconductor surfaces 2 which have different or varicolored color regions.

One preferred embodiment variant has proved to be particularly advantageous. In this embodiment variant, the semiconductor surfaces 2 have four color regions each having two identical and two different colors. In this case, the color regions preferably include the colors red (R), green (G) and blue (B). In this case, it is provided that the semiconductor surfaces have color regions with a substantially square form. A combination in which the color regions having different colors respectively emit red (R) and blue (B) light, and the two color regions having an identical color emit green (G) light, has proved to be particularly advantageous.

Figure 3B:
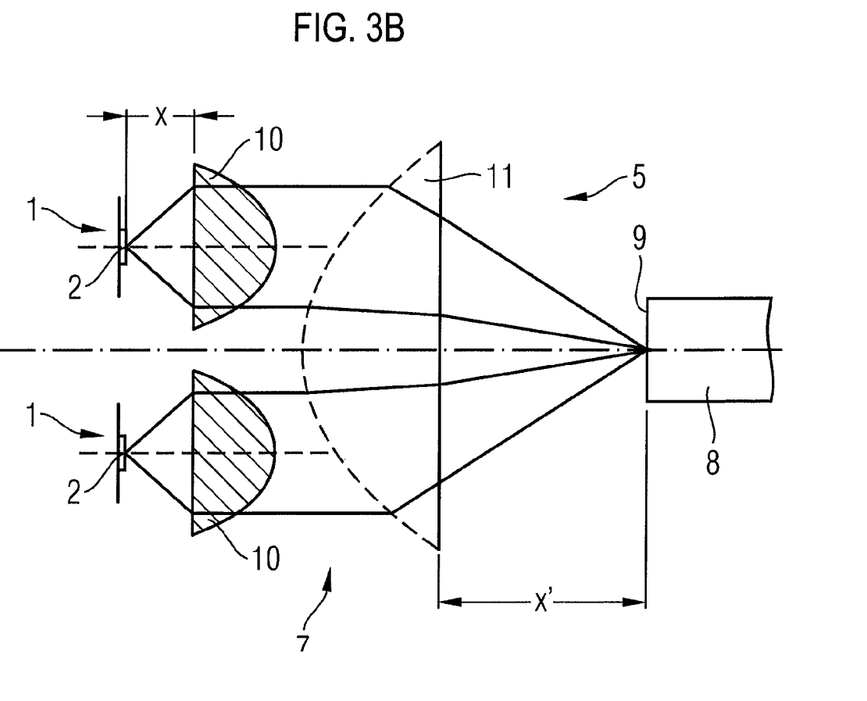
FIG. 3B is a fragmentary, cross-sectional view of a device according to the invention with an LED light source in accordance with FIG. 3A having a symmetrical lens configuration.

FIG. 3B shows a cross-sectional view from the side of the device 5 according to the invention with an LED light source 1 in accordance with FIG. 3A. The lens configuration 7 shows two of the semiconductor surfaces 2, which are assigned corresponding input lenses 10. Depending on the optical axis 16, the input lenses 10 correspond to the output lens 11, which is larger in circumference than each of the input lenses 10. Furthermore, the input focal length x of the input lenses 10 is less than the output focal length x' of the output lens 11. Consequently, the light is coupled into the optical waveguide 8 at an optimum solid angle. The solid angle is preferably equal in magnitude to the aperture angle of the optical waveguide 8 at the light entrance surface 9.

Figure 4A:
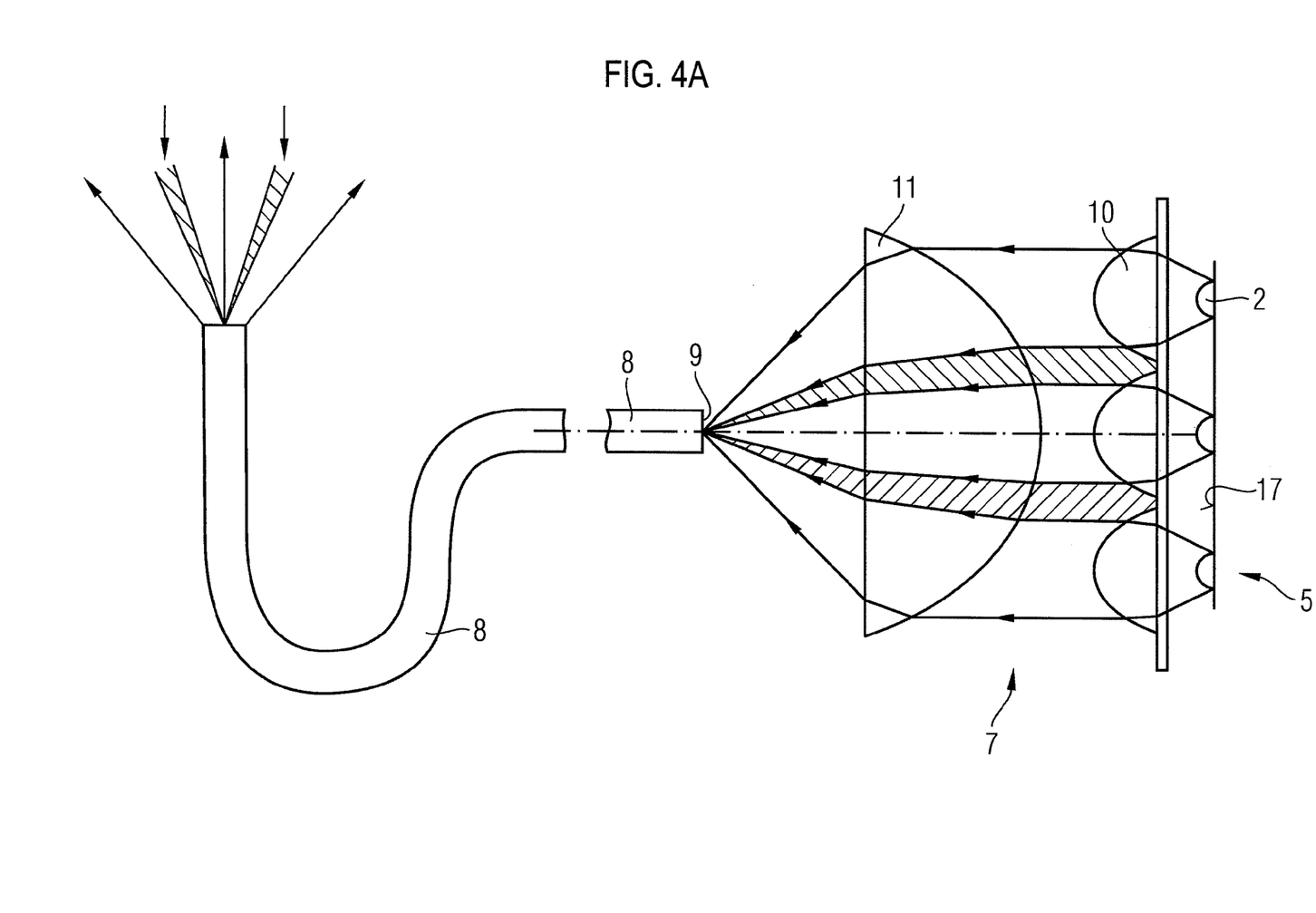
FIG. 4A is a fragmentary, cross-sectional view illustrating a basic construction of the device according to the invention without an additional optical element having a negative focal length.

FIG. 4A shows a basic illustration of the device 5 according to the invention in a cross-sectional view without an additional optical element 6 having a negative focal length. In this case, the light from the LED light source 1 is imaged through the lens configuration 7 onto the entrance surface 9 of the optical waveguide 8. Boundary surfaces 17 between the semiconductor surfaces 2 are imaged in this case in the same way as the light from the semiconductor surfaces 2. Consequently, during the transmission of the light in the optical waveguide 8, known physical effects arise, namely that the boundary regions with lower brightness then appear as dark rings at the light exit end of the optical waveguide 8.

Figure 4B:
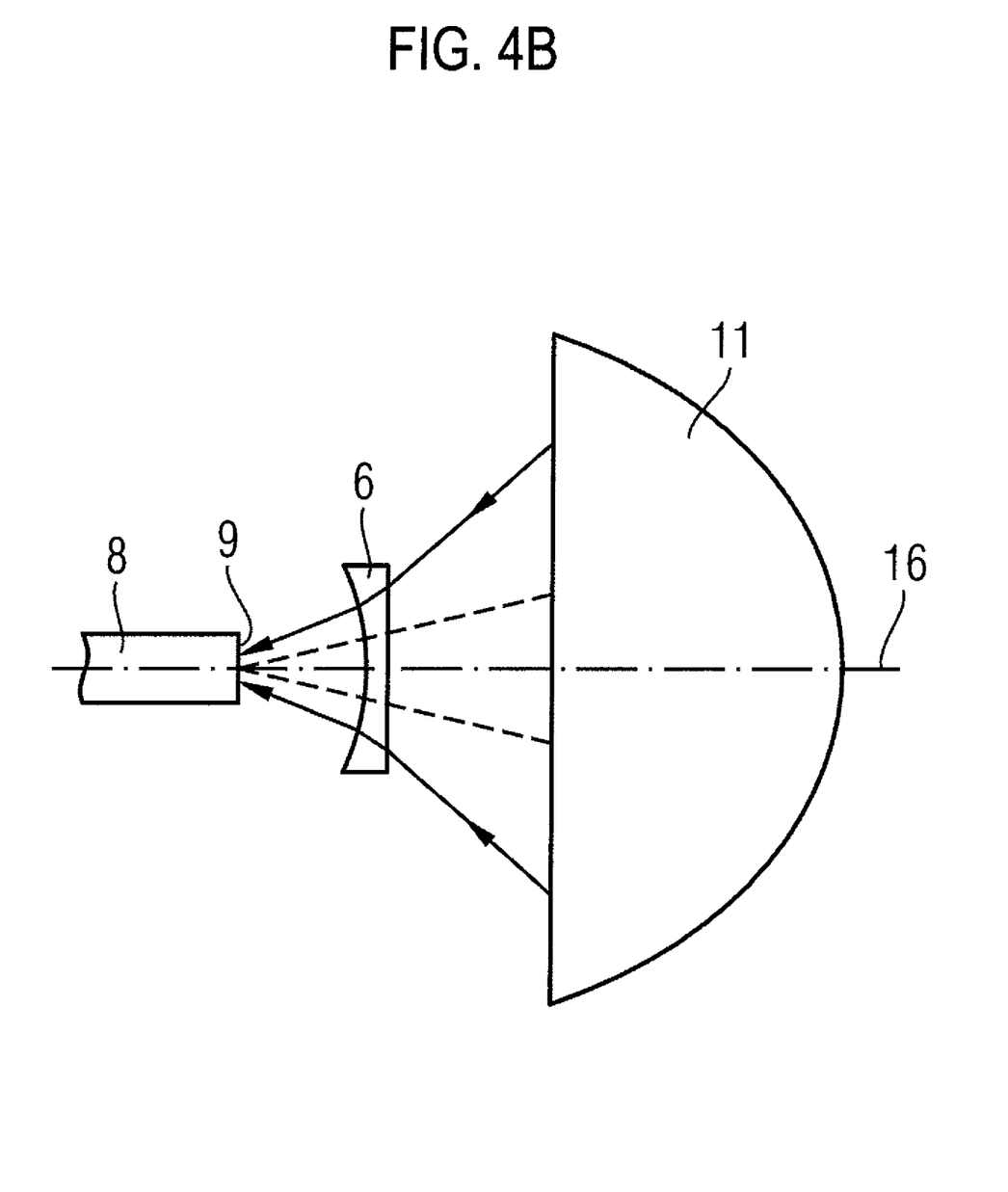
FIG. 4B is a fragmentary, basic illustration similar to a portion of FIG. 4B with an additional optical element having a negative focal length.

FIG. 4B furthermore shows a basic illustration of the configuration of the output lenses 11 of the device 5 according to the invention in accordance with FIG. 4A, with an additional optical element 6 having a negative focal length. The device 5 illustrated in FIG. 4A has the LED light source 1, in which boundary regions of lower brightness occur between the semiconductor surfaces 2, with the disadvantages described above. According to the invention, in order to avoid those disadvantages, provision is made for placing the additional optical element 6 having a negative focal length, directly in front of the entrance surface 9 of the optical waveguide. The light is thus deflected before imaging on the entrance surface 9, in such a way that the regions of different brightness or color are superimposed during imaging on the entrance surface 9 of the optical waveguide 8.

What is achieved in this way is that a homogeneous light emission is ensured at the light exit end of the optical waveguide 8. The additional optical element 6 having a negative focal length largely compensates for imaging structures caused by the structurally dictated construction of the LED light source 1 and of the lens configuration 7, which is advantageous for most applications of the device according to the invention.

The invention advantageously provides a device which corresponds to other types of coupling in. Combinations of the lens configuration according to the invention with further methods that are already known are thus possible. In particular, the use of plastic injection-molded parts as LED attachment optical units is still possible. The use of a light guiding rod or light guiding cone likewise remains possible with the invention. Moreover, customary principles for coupling LED light into the fiber-optic optical waveguide can still be used for improving the imaging of the light on the entrance surface 9 of the optical waveguide 8.

The invention has the advantage that an imaging scale of 1:2.3 of input imaging with respect to the output imaging is produced. The diagonal of a semiconductor surface 2 is thus imaged onto twice the size. In addition, a large solid angle is covered by the lens configuration, in such a way that besides low losses due to material properties, substantially the entire light power of the semiconductor surfaces 2 and thus of the LED light source 1 can be coupled into the optical waveguide 8.

A small distance between the LED light source 1 and the lens configuration 7 can be realized by choosing suitable lens types for the input lenses 11.

According to the invention, the device which is provided has a lens configuration having more than one lens in order to take into account the geometrical-optical boundary conditions.

Both in the case of white and in the case of monochromatic semiconductor surfaces 2, the device according to the invention can be realized with just two lenses and in a symmetrical configuration.

An asymmetrical configuration is proposed in order to cover larger solid angles and, in addition, to realize the desired imaging ratio of 1:2.3.

The crucial advantage of the invention in this case is that the lens configuration is not LED-specific in relation to known devices, that is to say that both the construction (e.g. with or without a primary lens) and the size of the LED light source can be arbitrary to the greatest possible extent.

The device according to the invention can be optimized further by improving the optical surfaces of the device with a broadband antireflection coating, in such a way that a higher transmission is made possible.

A further possibility of increasing the efficiency resides in using an optical waveguide 8 with a hot melt-bonded instead of adhesively-bonded entrance surface 9. The entrance surface 9 thus has a higher packing density of the fibers, thereby providing an improved surface for the light entrance.

The improvements in the light power of LED light sources that are expected in the future can also readily be handled with the device according to the invention, in such a way that a significant expansion of the possible areas of use of the device according to the invention can be expected.

The invention claimed is:

1. A fiber-optic device, comprising:
at least one LED light source having at least one light-emitting semiconductor surface;
a fiber-optic optical waveguide formed of a multiplicity of individual optical fibers combined at one end to form a light-receiving entrance surface; and
a lens configuration having at least two optical aspherical lenses associated directly with one another for imaging light from said at least one LED light source onto said entrance surface, said lenses including at least one input lens and one output lens, said one output lens having a larger diameter than said at least one input lens, and one input lens being associated with each respective light-emitting semiconductor surface.

2. The device according to claim 1, wherein said at least one input lens has a front vertex point, an input focal point and a distance between said front vertex point and said input focal point, and said output lens has a back vertex point, an output focal point and a distance between said back vertex point and said output focal point being greater than said distance between said front vertex point and said input focal point.

3. The device according to claim 1, wherein said output lens has an input focal length and an output focal length, and said input focal length is greater than said output focal length.

4. The device according to claim 1, wherein said lens configuration has an imaging ratio v between 1:2.4 and 1:2.2.

5. The device according to claim 1, wherein said lens configuration has an imaging ratio v=1:2.3.

6. The device according to claim 1, wherein said input lens provided for each respective light-emitting semiconductor surface of said LED light source takes up the light into said lens configuration.

7. The device according to claim 6, wherein said at least one input lens ensures an input angle $\Theta_E$ in a range between 110° and 130° for taking up the light from said at least one semiconductor surface.

8. The device according to claim 6, wherein said at least one input lens ensures an input angle $\Theta_E=120°$ for taking up the light from said at least one semiconductor surface.

9. The device according to claim 1, wherein said output lens of said lens configuration focuses the light from all of said semiconductor surfaces at an angle $\Theta_A$ in a range between 65° and 75° onto said entrance surface of said optical waveguide.

10. The device according to claim 1, wherein said output lens of said lens configuration focuses the light from all of said semiconductor surfaces at an angle $\Theta_A=70°$ onto said entrance surface of said optical waveguide.

11. The device according to claim 1, wherein said at least one input lens and said output lens of said lens configuration form an optical axis on which said at least one light-emitting semiconductor surface of said LED light source and said entrance surface of said optical waveguide are disposed.

12. The device according to claim 1, wherein said at least one light-emitting semiconductor surface of said LED light source is more than one light-emitting semiconductor surface, said at least one input lens is more than one input lens, and said semiconductor surfaces with said associated input lenses have a symmetrical configuration relative to an optical axis defined by said output lens.

13. The device according to claim 12, wherein one input lens is centered on said optical axis defined by said output lens.

14. The device according to claim 12, wherein each of said light-emitting semiconductor surfaces is subdivided into different color regions with identical color configuration, said semiconductor surfaces with said associated input lenses have a symmetrical configuration about said optical axis, and said configuration of said color regions of each of said semiconductor surfaces relative to said optical axis is identical.

15. The device according to claim 14, wherein a number of said semiconductor surfaces disposed about said optical axis amounts to a number or a multiple of said number of color regions of said semiconductor surfaces.

16. The device according to claim 14, wherein said semiconductor surfaces have four color regions including two identical and two different colors, and two of said color regions of the same color are adjacent said two different color regions.

17. The device according to claim 16, wherein said colors are red, green and blue.

18. The device according to claim 17, wherein said color regions of said semiconductor surfaces have a substantially square shape, said color regions having different colors emit red and blue light, and said two color regions having an identical color emit green light.

19. The device according to claim 1, which further comprises optical surfaces being antireflection-coated.

20. The device according to claim 1, wherein said optical fibers of said optical waveguide are at least one of hot melt bonded, adhesively bonded or press-fitted in a terminating sleeve, at said entrance surface.

21. The device according to claim 1, which further comprises an additional optical element having a negative focal length and being inserted directly in front of said entrance surface of said optical waveguide, said additional optical element deflecting the light at an angle corresponding to an imaging of boundary regions between said at least one light-emitting semiconductor surface at a solid angle of said output lens causing said deflection to compensate for brightness differences on said entrance surface of said optical waveguide.

* * * * *

UNITED STATES PATENT AND TRADEMARK OFFICE
CERTIFICATE OF CORRECTION

| | | |
|---|---|---|
| PATENT NO. | : 7,784,987 B2 | |
| APPLICATION NO. | : 12/137891 | |
| DATED | : August 31, 2010 | |
| INVENTOR(S) | : Jürgen Meinl | |

It is certified that error appears in the above-identified patent and that said Letters Patent is hereby corrected as shown below:

On the title page

Item 73 should read as follows:

(73) Assignee: Schott AG, Mainz (DE)

Signed and Sealed this
Twenty-ninth Day of March, 2011

David J. Kappos
*Director of the United States Patent and Trademark Office*